United States Patent
Kun-Szabo et al.

(10) Patent No.: US 10,433,354 B2
(45) Date of Patent: *Oct. 1, 2019

(54) WIRELESS COMMUNICATION DEVICES

(71) Applicant: Nokia Technologies Oy, Espoo (FI)

(72) Inventors: Zsolt Kun-Szabo, Budapest (HU); Süleyman Bakacak, Essen (DE); Juha Tervo, Bochum (DE); Jurgen Schonwald, Recklinghausen (DE)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/487,054

(22) Filed: Apr. 13, 2017

(65) Prior Publication Data

US 2017/0223759 A1    Aug. 3, 2017

Related U.S. Application Data

(63) Continuation of application No. 14/643,801, filed on Mar. 10, 2015, now Pat. No. 9,277,560, which is a
(Continued)

(30) Foreign Application Priority Data

Apr. 20, 2000 (GB) .................................. 0009873.1
May 26, 2000 (GB) .................................. 0012936.1

(51) Int. Cl.
*H04W 76/10* (2018.01)
*H04W 72/02* (2009.01)
(Continued)

(52) U.S. Cl.
CPC ............ *H04W 76/14* (2018.02); *H04L 67/04* (2013.01); *H04M 1/72561* (2013.01);
(Continued)

(58) Field of Classification Search
CPC ..... H04W 76/02; H04W 60/00; H04W 68/02; H04W 88/06
(Continued)

(56) References Cited

U.S. PATENT DOCUMENTS 5,539,744 A    7/1996 Chu et al.
5,809,415 A    9/1998 Rossmann
(Continued)

FOREIGN PATENT DOCUMENTS

EP    0691619 A2    1/1996
EP    0878940 A2    11/1998
(Continued)

OTHER PUBLICATIONS

Ericsson, "Mobile Phone R320 Design Guidelines for WAP services", Second edition, Jan. 2000, 30 pages.
(Continued)

*Primary Examiner* — Khawar Iqbal
(74) *Attorney, Agent, or Firm* — Ditthavong & Steiner, P.C.

(57) ABSTRACT

A telecommunication network is described in which information relating to access to resources such as the world wide web, may be transferred between wireless communication terminals at least one of which is a client of a server connected to the network and providing access to the resources. A method of transfer and a terminal suitable therefor are described.

20 Claims, 5 Drawing Sheets

Related U.S. Application Data continuation of application No. 13/460,357, filed on Apr. 30, 2012, now Pat. No. 9,661,633, which is a continuation of application No. 09/838,147, filed on Apr. 20, 2001, now Pat. No. 9,008,651.

(51) Int. Cl.
| | | |
|---|---|---|
| *H04W 40/00* | (2009.01) | |
| *H04W 76/14* | (2018.01) | |
| *H04L 29/08* | (2006.01) | |
| *H04M 1/725* | (2006.01) | |
| *H04W 72/04* | (2009.01) | |
| *H04W 88/06* | (2009.01) | |
| *H04L 29/06* | (2006.01) | |
| *H04W 92/18* | (2009.01) | |

(52) U.S. Cl.
CPC ......... *H04W 72/02* (2013.01); *H04W 72/048* (2013.01); *H04W 76/10* (2018.02); *H04L 67/42* (2013.01); *H04W 40/00* (2013.01); *H04W 88/06* (2013.01); *H04W 92/18* (2013.01)

(58) Field of Classification Search
USPC .................. 455/410–411, 414.1–414.4, 415, 455/418–420, 426.1–426.2, 432.3, 456
See application file for complete search history.

(56) References Cited

U.S. PATENT DOCUMENTS

| | | | |
|---|---|---|---|
| 5,826,269 A | 10/1998 | Hussey | |
| 5,862,321 A | 1/1999 | Lamming et al. | |
| 5,979,757 A | 11/1999 | Tracy et al. | |
| 6,061,346 A | 5/2000 | Nordman | |
| 6,144,464 A | 11/2000 | Rupp et al. | |
| 6,161,143 A | 12/2000 | Tayama et al. | |
| 6,275,693 B1* | 8/2001 | Lin ........................ | H04W 76/12 455/414.3 |
| 6,301,471 B1 | 10/2001 | Dahm et al. | |
| 6,484,205 B1 | 11/2002 | Byford | |
| 6,490,291 B1 | 12/2002 | Lee et al. | |
| 6,523,062 B1 | 2/2003 | Bridgman et al. | |
| 6,549,776 B1 | 4/2003 | Joong | |
| 6,584,321 B1 | 6/2003 | Coan et al. | |
| 6,600,918 B1 | 7/2003 | Youngs et al. | |
| 6,625,126 B1 | 9/2003 | Kikinis | |
| 6,711,414 B1 | 3/2004 | Lightman et al. | |
| 6,799,203 B2 | 9/2004 | Oommen | |
| 6,822,954 B2 | 11/2004 | McConnell et al. | |
| 6,865,191 B1* | 3/2005 | Bengtsson ............... | H04L 51/38 370/475 |
| 6,886,095 B1* | 4/2005 | Hind .................... | H04L 63/0823 713/168 |
| 6,895,240 B2 | 5/2005 | Laursen et al. | |
| 6,937,869 B1 | 8/2005 | Rayburn | |
| 7,003,284 B2 | 2/2006 | Schwartz et al. | |
| 7,020,685 B1 | 3/2006 | Chen et al. | |
| 7,161,925 B2 | 1/2007 | Wallenius et al. | |
| 7,308,254 B1 | 12/2007 | Rissanen | |
| 7,404,148 B2 | 7/2008 | Lincke et al. | |
| 7,451,177 B1 | 11/2008 | Johnson et al. | |
| 7,778,595 B2 | 8/2010 | White et al. | |
| 7,894,474 B1* | 2/2011 | Bell ........................ | G08C 19/28 370/466 |
| 7,912,453 B2 | 3/2011 | Coan et al. | |
| 9,756,168 B1* | 9/2017 | Rao ........................ | H04M 1/72533 |
| 2001/0012779 A1* | 8/2001 | Skog ........................ | H04W 8/20 455/436 |
| 2001/0016487 A1* | 8/2001 | Hiatt, Jr. ........... | H04M 1/274516 455/419 |
| 2001/0037254 A1 | 11/2001 | Glikman | |
| 2001/0041556 A1 | 11/2001 | Laursen et al. | |
| 2002/0009991 A1 | 1/2002 | Lu et al. | |
| 2002/0026500 A1 | 2/2002 | Kanefsky et al. | |
| 2002/0037715 A1* | 3/2002 | Mauney ............ | H04M 1/72519 455/421 |
| 2002/0059405 A1 | 5/2002 | Angwin et al. | |
| 2002/0094787 A1 | 7/2002 | Avnet et al. | |
| 2002/0118723 A1 | 8/2002 | McCrady et al. | |
| 2002/0120719 A1 | 8/2002 | Lee et al. | |
| 2002/0123335 A1 | 9/2002 | Luna et al. | |
| 2002/0176379 A1 | 11/2002 | Wallenius et al. | |
| 2003/0092452 A1 | 5/2003 | Youngs et al. | |
| 2003/0214529 A1 | 11/2003 | Martin, Jr. et al. | |
| 2004/0068665 A1 | 4/2004 | Fox et al. | |
| 2004/0249899 A1 | 12/2004 | Shiigi | |
| 2004/0252727 A1 | 12/2004 | Mousseau et al. | |
| 2005/0027849 A1* | 2/2005 | Cianciarulo ........... | G06Q 10/10 709/223 |
| 2005/0064887 A1 | 3/2005 | Bengtsson et al. | |
| 2005/0141060 A1* | 6/2005 | Rydbeck .................. | B41J 2/315 358/512 |
| 2005/0159107 A1 | 7/2005 | Mauney et al. | |
| 2005/0251448 A1* | 11/2005 | Gropper ............ | G06Q 10/1093 705/14.61 |
| 2007/0112934 A1* | 5/2007 | Inoue .................. | H04M 7/0015 709/217 |
| 2008/0040782 A1 | 2/2008 | Laursen et al. | |
| 2008/0307040 A1 | 12/2008 | So | |
| 2009/0030978 A1 | 1/2009 | Johnson et al. | |
| 2009/0081991 A1 | 3/2009 | Titus et al. | |
| 2009/0197646 A1 | 8/2009 | Tamura et al. | |
| 2011/0269424 A1* | 11/2011 | Multer ................ | H04L 67/1095 455/411 |
| 2012/0078702 A1 | 3/2012 | Rissanen | |
| 2015/0189099 A1 | 7/2015 | Titus et al. | |

FOREIGN PATENT DOCUMENTS

| | | |
|---|---|---|
| EP | 0915590 A2 | 5/1999 |
| EP | 0917328 A2 | 5/1999 |
| EP | 0924921 A1 | 6/1999 |
| EP | 0926613 A2 | 6/1999 |
| EP | 0973299 A2 | 1/2000 |
| EP | 0973300 A2 | 1/2000 |
| EP | 0989722 A1 | 3/2000 |
| EP | 0991242 A2 | 4/2000 |
| EP | 1045598 A1 | 10/2000 |
| EP | 1139633 A2 | 10/2001 |
| EP | 1164765 A2 | 12/2001 |
| EP | 1183894 A1 | 3/2002 |
| EP | 1764966 A1 | 3/2007 |
| GB | 2327564 A | 1/1999 |
| GB | 2344491 A | 6/2000 |
| WO | 9811644 A1 | 3/1998 |
| WO | 9811744 A1 | 3/1998 |
| WO | 9832301 A1 | 7/1998 |
| WO | 9841004 A1 | 9/1998 |
| WO | 9919988 A2 | 4/1999 |
| WO | 9962223 A2 | 12/1999 |
| WO | 0008822 A1 | 2/2000 |
| WO | 0018161 A2 | 3/2000 |
| WO | 0076249 A1 | 12/2000 |

OTHER PUBLICATIONS

Wireless Application Protocol, "Wireless Application Group User Profile Specification", WAG UAPROF Version Nov. 10, 1999, 76 pages (pp. 1-74).
Wireless Application Protocol, "Wireless Application Protocol Push Access Protocol Specification", WAP Push Access Protocol Version Nov. 8, 1999, 44 pages.
Palm Computing Platform, "Web Clipping Developer's Guide", Document No. 3009-001, Print date Nov. 3, 1999, 94 pages.
Novatel Wireless, "Minstrel III User Manual", Feb. 2015, 13 pages.
PC Guide, "Web Building", No. 3, Mar. 2000, pp. 116-120.
Mobile Times, "Ericsson R320s—Laufende Tests", Apr. 18, 2005, retrieved from http://mobile-times.ch/handytest/eri_r320_1.html, 1 page.

(56) References Cited

OTHER PUBLICATIONS

Wireless Application Protocol, Wireless Application Protocol Wireless Application Environment Specification Version 1.2, WAP WAE Specification Version Nov. 4, 1999, pp. 1-30.
Wireless Application Protocol, "Wireless Application Protocol Wireless Datagram Protocol Specification", WAP WDP Version Nov. 5, 1999, pp. 1-78.
Wireless Application Protocol, "Wireless Application Protocol Wireless Transport Layer Security Specification", WAP WTLS Version Nov. 5, 1999, pp. 1-96.
Wireless Application Protocol, "Wireless Application Protocol Wireless Session Protocol Specification", WAP WSP Version Nov. 5, 1999, pp. 1-114.
Wireless Application Protocol, "Wireless Application Protocol, Push OTA Protocol Specification", WAP Push OTA Protocol Version Nov. 8, 1999, 20 pages.
Alden et al., "vCard, the Electronic Business Card", Version 2.1, A versit Consortium Specification, Sep. 18, 1996, https://www.imc.org/pdi/vcard-21.txt, 17 pages.
AU-System Radio AB, "WAP White Paper", Feb. 1999, XP002901226, retrieved from the Internet: URL:http://www.wapguide.com/wapguide/AUwap.pdf [retrieved Oct. 20, 2000], 22 Pages.
3COM , "Handbook for the Palm VII Organizer", User Manual, 1998, retrieved on Apr. 12, 2017 from http://pdf.textfiles.com/manuals/PDA/PalmOne%20VII%20Handheld.pdf, 302 Pages.
Business Wire, "Wireless Market Access for Trading", New Zealand, Mar. 20, 2000, 1 Page.
Cas @ Work, "Mit Dem Handy Adressen im Internet Suchen", Magazine Excerpt, Cas @ Work, No. 8, Feb. 2000, with English statement of relevance, 3 Pages.
Dawson et al., "VCard MIME Directory Profile", Request for Comments: 2426, Standards Track, The Internet Society, Sep. 1998, 42 Pages.
Derstandard, "Wie Der Digitale Mobilfunk Die Telefonie Revolutionierte", Magazine Article, http://derstandard.at/1259281020910IWie-der-digitale-Mobilfunk-die-Telefonie-revolutionierte, Dec. 2, 2009, with English statement of relevance, 3 Pages.
Ericsson GMBH, "Ericsson Prasentiert Erste Handy-Studie Mit Titan"—"Ericsson Testet Handy-Gehause Aus Dem Besonders Strapazierfahigen Titan", Press release, http://www.pressportal.de/pm/13502/110867/ericsson-praesentiert-erste-handy-studie-mit-titan-ericsson-testtet-handy-gehaeuse-aus-dem-besonders?search=cebit; Feb. 11, 2000, with English statement of relevance, 2 Pages.
Ericsson Mobile Communications AB, "Contents at a Glance", User's Guide, Excerpt from the English language user's guide of Ericsson R320s mobile phone, 1999, 1 Page.
Ericsson Mobile Communications AB, "Ericsson R320s User Manual", Ericsson R320s Mobile Phone User's Guide, 2nd edition, Dec. 1999, 165 Pages.
Ericsson Mobile Communications AB, "Mobile Phone R320s White Paper", Mar. 2000, 44 Pages.
Ericsson, "Prasentation Des Ericsson R320s am Sep. 23, 1999 in Hong Kong", Ericsson press release of Sep. 23, 1999, excerpt from http://pressrelations.de/new/standard/result_main.cfm?aktion=jour_pm&r=11601 on Mar. 4, 2000 and Jun. 10, 2000, retrieved from http://archive.org, with English statement of relevance, 4 Pages.
Ericsson, Excerpt from Ericsson's Homepage http://mobile.ericsson.com on Jun. 10, 2000, retrieved from http://archive.org, 1 Page.
Ericsson, Excerpt from Ericsson's Homepage http://mobile.ericsson.com on Mar. 4, 2000, retrieved from http://archive.org, 1 Page.
Eudora Pro Email, "Version 4.2 for Windows User Manual", Qualcomm Incorporated, 1999, 3 Pages.
European Patent Application No. 01303576.1, Response to Official Communication dated Feb. 27, 2004, submitted Sep. 8, 2004, 17 Pages.
Excerpt from the English handbook of Ericsson R320s mobile phone.
Excerpt from the German handbook of Ericsson R320s mobile phone.
Excerpt from the Russian handbook of Ericsson R320s mobile phone.
Funkschau, "IrDa Soli Schneller Werden", Magazine, Aug. 20, 1999, with English statement of relevance, 5 Pages.
German Handbook of Ericsson R320s mobile phone, 92 Pages.
Kawaguchi et al., "Ad Hoc Network System Based on Infrared Communication", 1999 International Workshops on Parallel Processing, IEEE, Sep. 21-24, 1999, retrieved on Apr. 12, 2017 from https://pdfs.semanticscholar.org/12ef/bc1030362b414038fa1983dea598a99f21a2.pdf, pp. 114-119.
Mathis et al., "TCP Selective Acknowledgment Options", Request for Comments: 2018, Standards Track, Oct. 1996, 12 Pages.
Newton, "The Official Dictionary of Telecommunications", 14th Edition, Newton's Telecom Dictionary, Mar. 1998, pp. 15, 275, 354, 375-378, 452, 761, 794 and 806.
European Office Action for corresponding European Patent Application No. 01303576.1 dated Feb. 27, 2004, pp. 1-6.
Office Action for related U.S. Appl. No. 13/460,357, dated Jun. 14, 2013, pp. 1-48.
Panda et al., "Proceedings of the 1999 International Workshops on Parallel Processing", IEEE Computer Society, Sep. 21-24, 1999, 14 Pages.
Pehrson, "WAP—The Catalyst of the Mobile Internet", Ericsson Review No. 1, XP000908190A, 2000, pp. 1-6.
Postel, "Transmission Control Protocol", Request for Comments 793, Darpa Internet Program, Sep. 1981, 91 Pages.
Ericsson, "Ericsson stellt WAP-Handy R320s vor", Press Release, Sep. 23, 1999, retrieved on Apr. 12, 2017 from http://www.pressrelations.de/new/standard/result_main.cfm?aktion=jour_pm&r=11601, 3 Pages.
Rekimoto, "Pick-and-Drop: A Direct Manipulation Technique for Multiple Computer Environments", Proceedings of 10th annual ACM Symposium on User Interface Software and Technology, 1997, pp. 31-39.
Office Action for corresponding European Patent Application No. 01303576.1, dated May 16, 2003, 4 pages.
SES Technology R&D Group, "Introduction to the IrDA Protocol", 1997, retrieved on Apr. 12, 2017 from https://seniordesign.engr.uidaho.edu/2011-2012/onsemiconductorip/documents/IntroductiontoIrDA.pdf, 22 Pages.
Wikipedia, "Email Address", online http://en.wikipedia.org/wiki/Email_address, retrieved Jul. 26, 2013, 8 Pages.
Wikipedia, "Palm VII", online http://en.wikipedia.org/wiki/Palm_VII, retrieved Jul. 26, 2013,1 Page.
Wikipedia, "Transmission Control Protocol", online http://en.wikipedia.org/wiki/Transmission_Control_Protocol, retrieved Jul. 26, 2013, 15 Pages.
Wikipedia, "Windows CE", online http://en.wikipedia.org/wiki/Windows_CE, retrieved May 8, 2013, 8 Pages.
WAP, "Wireless Application Protocol, Architecture Specification", WAP Architecture, Version Apr. 30, 1998, Wireless Application Protocol Forum, Ltd. 1998, 20 Pages.
WAP, "Wireless Application Protocol, Wireless Application Environment Overview", WAP WAE Proposed Version Feb. 3, 1999, Wireless Application Protocol Forum, Ltd. 1998,1999, 26 Pages.

\* cited by examiner

```
83 ──//URLCARD
    BEGIN:URLCARD
    VERSION 1.0
81 ──T:CNN LATEST

82 ──U:http://www.myurl.hu/something/index.wml
    END:URLCARD
```
80

WIRELESS COMMUNICATION DEVICES

CROSS REFERENCE TO RELATED APPLICATIONS

This application is a continuation of U.S. patent application Ser. No. 14/643,801 filed Mar. 10, 2015, titled "Wireless Communication Devices", which is a continuation of U.S. patent application Ser. No. 13/460,357 filed Apr. 30, 2012, titled "Wireless Communication Devices", which is a continuation of U.S. patent application Ser. No. 09/838,147, filed Apr. 20, 2001, titled "Wireless Communication Devices", the entire disclosure of which is hereby incorporated by reference herein.

BACKGROUND OF THE INVENTION

The present invention relates to a method of transferring browser information and/or parameters between wireless communication devices in a telecommunication network, particularly although not exclusively a network supporting the Wireless Application Protocol (WAP) and also to apparatus therefor.

As is well known, Internet content and advanced data services can now be obtained by users equipped with suitably configured communication devices such as mobile radio telephones. In order to provide such services to wireless communication devices such as radio telephones, pagers and the like, there has been developed a de facto standard known as the Wireless Application Protocol (WAP). It allows a wireless communication device to communicate over the air with a server connected to the Internet. A Wireless Application Environment that is placed on top of the WAP stack includes a microbrowser. The browser uses wireless mark-up language (WML), a lightweight mark-up language and WMLScript, a lightweight scripting language.

WML implements a card and deck metaphor. The interaction of the browser and user is described in a set of cards that are grouped together into a document commonly referred to as a deck. The user navigates to a card in a deck reviews its content and then navigates to another card in the same deck or in a different deck. Decks of cards are transferred from origin servers as needed.

As the number and variety of content and service providers increases it is becoming increasingly apparent that there exists a need to facilitate the dissemination of information amongst users of wireless communication devices.

SUMMARY OF THE INVENTION

It is thus an aim of the present invention to seek to promote the dissemination of information relating to Internet content and service providers. It is a further aim of the invention to facilitate the configuration of communication devices to obtain more effectively such services.

Thus, according to one aspect of the invention, there is provided a method of transferring resource related information from a first terminal to a second terminal of a wireless communication network, wherein at least the first terminal is a client of a server connected to an external network and also to the wireless communication network which includes the terminals, comprising the steps of the first terminal negotiating a connection with the second terminal and subsequently transferring the information over the connection.

Preferably, the information facilitates access to an external network resource by the second terminal such as a URL, browser settings or the like. Alternatively, the information may have been previously downloaded from the external network and could comprise the contents of a web page. Where the user and/or the nature of the information requires it, the connection negotiated between the terminals should allow real-time transfer of that information. For example, the connection could be established as a point to point connection utilising circuit or packet switched data. In another situation, perhaps were some latency is acceptable and/or in the interests of reducing costs, a connection which does not allow real-time transfer of the information may be negotiated.

The method is particularly suitable for use under the Wireless Application Protocol (WAP). The connection may be indirect in the sense that the information is transported over the wireless communication network for example by SMS (Short Message Service), CSD (Circuit Switched Data) or GPRS (General Packet Radio Service), or direct using Infra Red (IR), Low Power Radio Frequency (LPRF) or other suitable mechanism. Where the method is implemented under WAP, the connection whether direct or indirect will conform to the appropriate Wireless (Application Protocol) Datagram Protocol (WDP).

According to another aspect of the invention, there is provided a wireless communication terminal for use with the above described method.

Preferably, the wireless communication terminal comprises a controller arranged to receive an input of resource related information from another terminal, wherein the controller is further arranged to negotiate a connection with the other terminal and subsequently to receive the information over the connection. A terminal from which the information is transferred may operate under the Wireless Application Protocol (WAP) whereas a terminal receiving the information need not implement WAP although at the expense of reduced functionality.

In order to assist in understanding the present invention, a number of embodiments thereof will now be described by way of example and with reference to the accompanying drawings, in which:

DETAILED DESCRIPTION OF THE INVENTION

Figure 1:
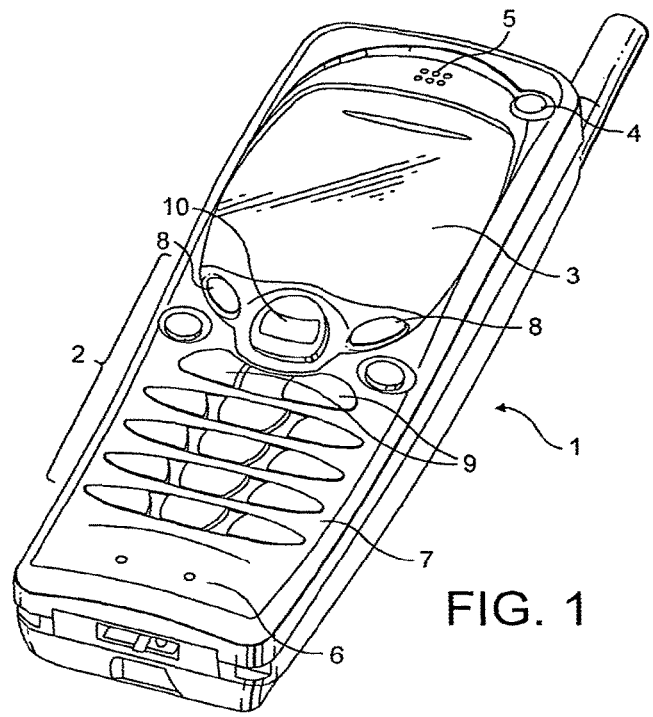
FIG. 1 schematically illustrates a wireless communication device suitable for use according to a method of the present invention.

With reference to FIG. 1, there is shown a wireless communication device or terminal. The terminal, which is generally designated by 1, comprises a user interface having a keypad 2, a display 3, an on/off button 4, a speaker 5, and a microphone 6. The terminal 1 is adapted for communication via a wireless telecommunication network, e.g. a cellular network. However, the terminal 1 could also have been designed for a cordless network. The keypad 2 has a first group 7 of keys as alphanumeric keys, by means of which the user can enter a telephone number, write a text message (SMS), write a name (associated with the telephone number), etc. Each of the twelve alphanumeric keys 7 is provided with a figure "0-9" or a sign "#" or "*", respectively. In alpha mode, each key is associated with a number of letters and special signs used in text editing.

The keypad 2 additionally comprises two soft keys 8, two call handling keys 9, and a navigation key 10.

The two soft keys 8 have a functionality corresponding to what is known from the terminals manufactured by Nokia under the following designations: Nokia 2110™, Nokia 8110™ and Nokia 3810™. The functionality of the soft key depends on the state of the terminal and the navigation in the menu by using a navigation key. The present functionality of the soft keys 8 is shown in separate fields in the display 3 just above the keys 8.

The two call handling keys 9 are used for establishing a call or a conference call, terminating a call or rejecting an incoming call.

The navigation key 10 is an up/down key and is placed centrally on the front surface of the terminal between the display 3 and the group of alphanumeric keys 7. Hereby the user will be able to control this key by simply pressing the up/down key using his/her thumb. Since many experienced terminal users are used to one-hand control, it is a very good solution to place an input key, requiring precise motor movements. Thus, the user may place the terminal in the hand between the fingertips and the palm of the hand, leaving the thumb free for inputting information.

Figure 2:
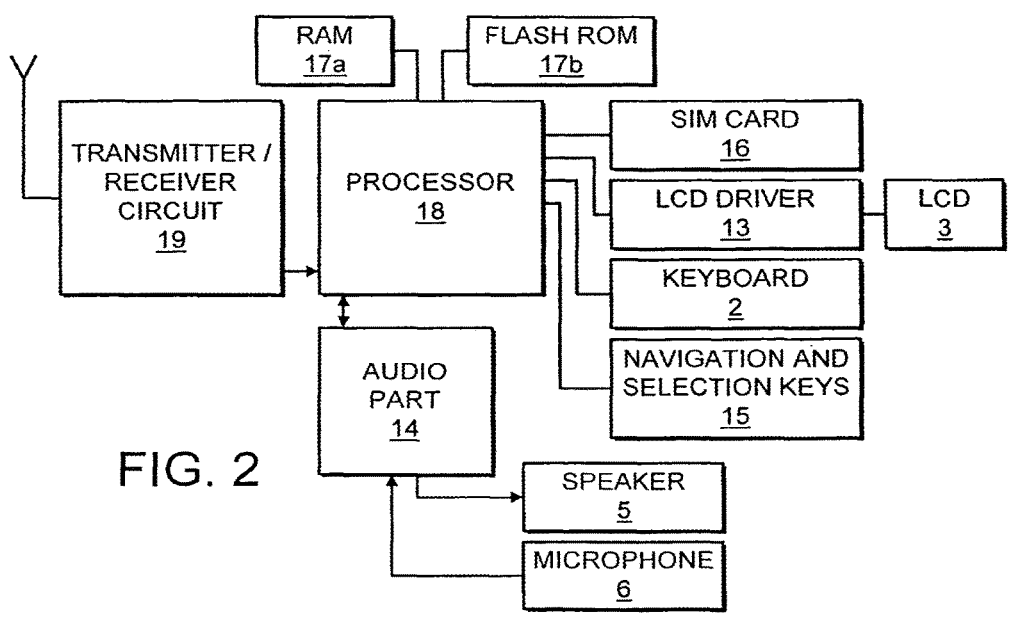
FIG. 2 shows a block diagram of the main elements of the communication device of FIG. 1.

FIG. 2, schematically shows the elements of the terminal 1. The terminal 1 is adapted for use in connection with a GSM network, but, of course, the invention may also be applied in connection with other phone networks, such as other kinds of cellular networks and various forms of cordless terminal systems or in dual band terminals accessing sets of these systems/networks. The microphone 6 records the user's speech, and the analogue signals formed thereby are A/D converted in an A/D converter (not shown) before the speech is encoded in an audio part 14. The encoded speech signal is transferred to controller means 18, which may support software in the terminal. The controller means 18 also forms the interface to the peripheral units of the apparatus, including a RAM memory 17a and a Flash ROM memory 17b, a SIM card 16, the display 3 and the keypad 2 (as well as data, power supply, etc.). The controller means 18 communicates with the transmitter/receiver circuit 19. The audio part 14 speech-decodes the signal, which is transferred from the controller 18 to the earpiece 5 via a D/A converter (not shown).

The controller means 18 is connected to the user interface. Thus, the controller means 18 monitors the activity in the terminal and controls the display 3 in response thereto.

Therefore, the controller means 18 detects the occurrence of a state change event and changes the state of the terminal and thus the display text. A state change event may be caused by the user when he activates the keypad including the navigation key 10, and these type of events are called entry events or user events. However, the network communicating with the terminal may also cause a state change event. This type of event and other events beyond the user's control are called non user events. Non user events comprise status change during call set-up, change in battery voltage, change in antenna conditions, message on reception of SMS, etc.

Figure 3:
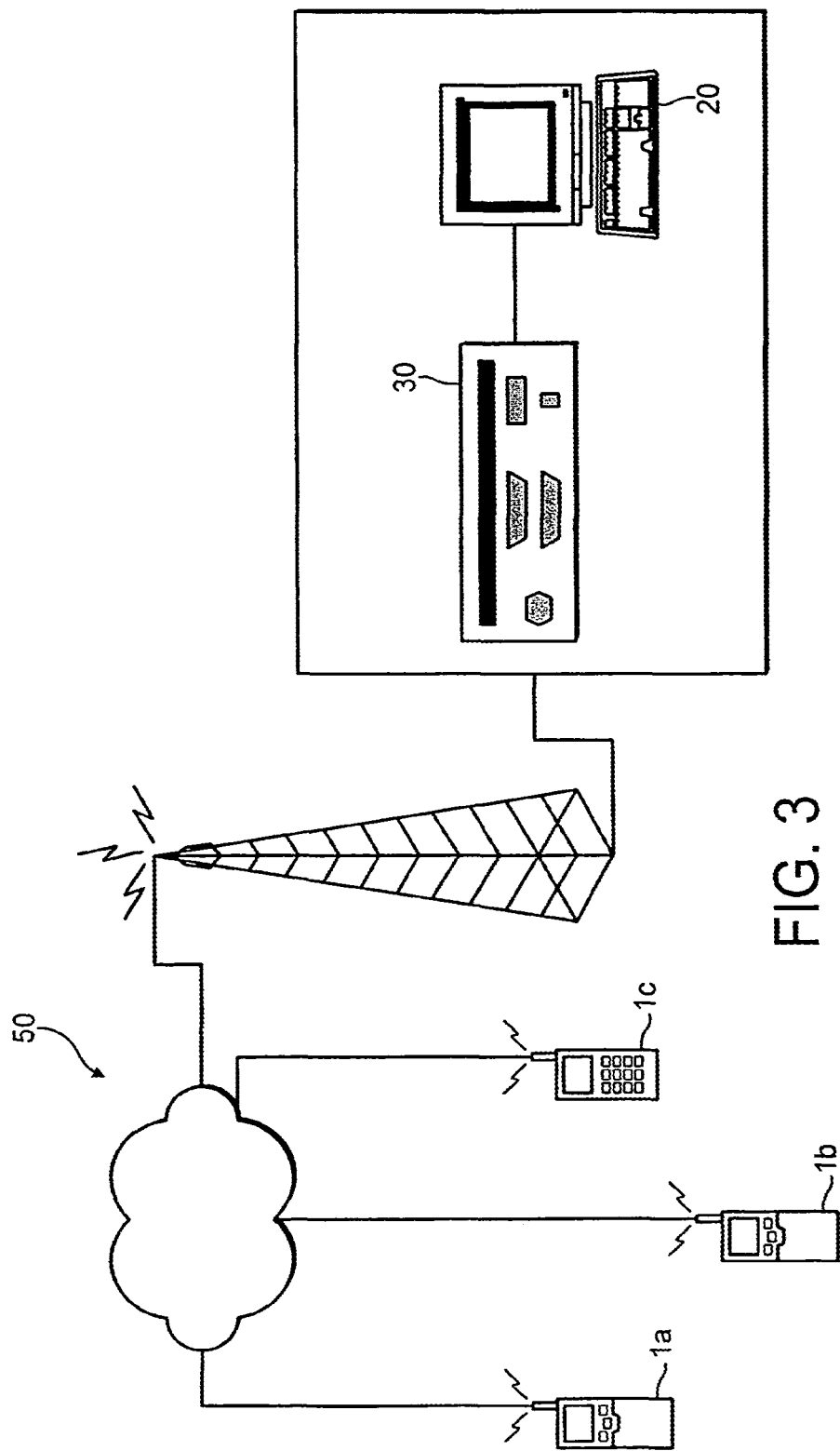
FIG. 3 shows a network including the device of FIG. 1.

FIG. 3 schematically shows a network 50, comprising a server computer 20 and a plurality of terminals or clients 1a, 1b and 1c. The server 20 and the clients 1 support the Wireless Application Protocol (WAP). The WAP content and its applications are specified in a set of well-known content formats based on the familiar WWW content formats. WAP is disclosed in the Wireless Application Protocol Architecture Specification; Version 30-Apr.-1998; by Wireless Application Protocol Architecture Working Group.

When transporting content between the client 1 and the server 20, the content is transported using a set of standard communication protocols based on the WWW communication protocols known as the Wireless Datagram Protocol (WDP). A browser in the client 1 co-ordinates the user interface and is analogous to a standard web browser. The client 1 is provided in an environment, which makes it possible to reach a wide variety of different wireless platforms, e.g. World Wide Web (WWW). The environment provided may be referred to as Wireless Application Environment (WAE). This means that the client 1 may be supported by some kind of browser, e.g. a micro-browser, to access the different services connected to the server 20. In order to access the services, the browser includes the following functionalities:

Wireless Markup Language (WML)—a lightweight Markup language, similar to HTML, but optimised for use in hand-held mobile terminals;

WML Script—a lightweight scripting language, similar to JavaScript™;

Wireless Telephony Application (WTA, WTAI)—telephony services and programming interfaces; and Content Formats—a set of well-defined data formats, including images, phone book records and calendar information.

The server 20 supporting the Wireless Application Protocol is connected to a gateway 30 or in a non-illustrated variant, the gateway and server may be implemented together. The gateway 30 is also a kind of server, which identifies and encodes/decodes information between the client 1 and the server computer 20. This means that the gateway 30 is provided with encoders and decoders (not shown). In addition, the server 20 may comprise different algorithms to carry out encrypting/decrypting The encrypting/decrypting itself may be performed by well-known methods, e.g. RSA, Diffie-Hellman, etc. The server computer 20 may comprise different scripts to support WAP and data to be accessed by the client. This data may comprise all kinds of information, e.g. weather reports, news, information from stock markets, etc.

In order to access the server computer 20, from the client 1, the server 20 is connected to a wireless telecommunication network 50, e.g. a cellular telephone network. The network 50 comprises memory means (not shown), which is arranged to identify the identification means from the client 1. The memory means can be e.g. a database, comprising information about different subscribers of the network. Thus, when a client 1 tries to establish a connection to the network, the network determines if the client 1 is stored in the memory means in which case access is allowed to the network 50. The manner by which a client 1 establishes a connection to the network 50 is well known in the art and no further description thereof is considered necessary.

Once a connection has been established to the network 50, and the client 1 is operating in the WAE then data can be transported between the client 1 and server 20 via the gateway 30 at the request of a user of the client 1. The manner in which the user interacts with the client is well known from the above WAP documentation. Thus, the interaction of the browser and user is described in a set of cards that are grouped together into a document commonly referred to as a deck. The user navigates to a card in a deck reviews its content and then navigates to another card in the same deck or in a different deck. Decks of cards are transferred from the server 20 as needed.

Figure 4:
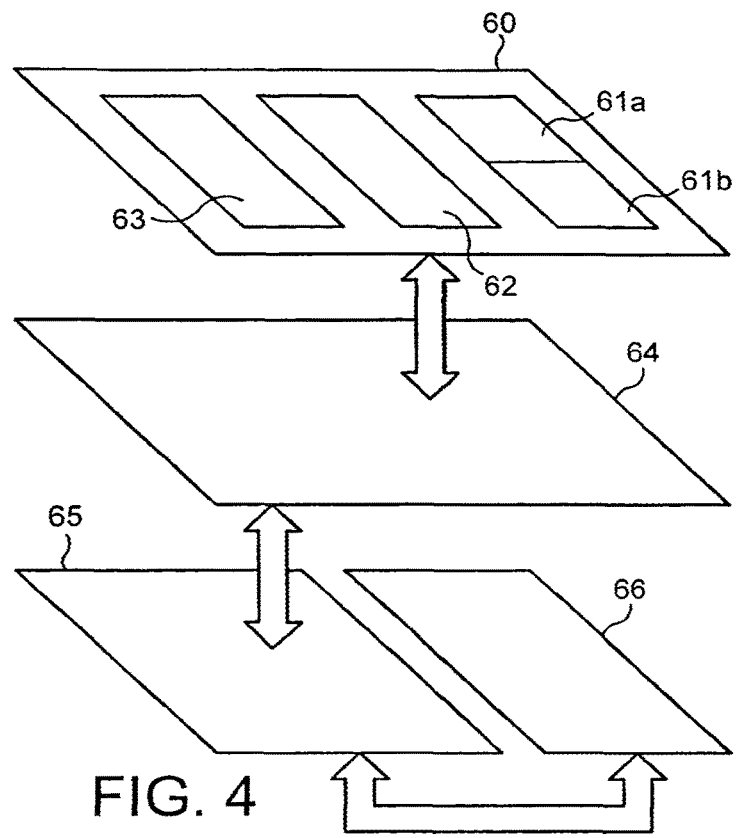
FIG. 4 is a diagram illustrative of the exchange of data between decks in accordance with the Wireless Application Protocol.

In more detail, and with reference to FIG. 4, there is shown a Main Deck 60 comprising three cards: a Start Card 61, an Option Card 62 and an Exit Card 63. On activation of a WAP session, the Main Deck 60 is loaded into the browser and the Start Card 61 is automatically activated. The start card 61 has a first portion 61*a* which defines a number of parameters each of which is assigned a value reflecting the value of the parameter in a "master copy" (not shown) of the content stored in the server 20. The second portion 61*b* of the Start Card 61 updates the parameter values to reflect the value of the parameters stored locally in the client 1. The second portion 61*b* sequentially effects access to Link Decks 64 that form the second level in the hierarchy, each of which respectively effects access to a WML Deck 65 and Storage Deck 66 in a third layer of the hierarchy. Thus the second portion 61*b* ensures that the Link Decks 64, WML Deck 65 and Storage Deck 66 are loaded into a client cache from the server 20 if not already there. The WML Deck 65 comprises content such as an email or news piece, whilst a corresponding Storage Deck 66 contains parameters associated with the WML Deck 65 such as whether the email or news piece has been read The Option card 62 is entered on reaching the end of the Start Card 61. The Option card 62 has a number of portions, each of which is associated with a defined one of the Link Decks 64 in the second layer of hierarchy. On entering the Option Card 62, the portions are automatically activated, sequentially creating user selectable links to the WML Deck 65 on the display of the terminal 1. Activation by the user causes the browser to access the selected WML Deck 65 in the third layer of hierarchy. The browser first tries to load the Deck 65 from the cache and if unsuccessful requests its transfer from the server 20.

The Exit Card 63 is accessed when the application entered through the Main Deck 60 is exited. The exit card 63 is used to keep the "master records" stored in the server 20 in line with the records stored and updated in the browser. The storage decks 66 each store parameters that may vary during an application session. For example the parameter indicating whether a mail or news piece has been read will change if the WML deck 65 containing the email or news is accessed also a parameter may indicate that the user has chosen to delete a news piece or email. The exit card 63 creates a message that identifies the new values of the changed parameters and sends it to the server 20.

In the event that a user (hereinafter the sender) locates resource related information such as a service or content which he believes might be of interest to another party (hereinafter the recipient) he may wish to provide the relevant information to that recipient. In the following, it is assumed that all the terminals 1 can communicate with the network 50.

Figure 5:
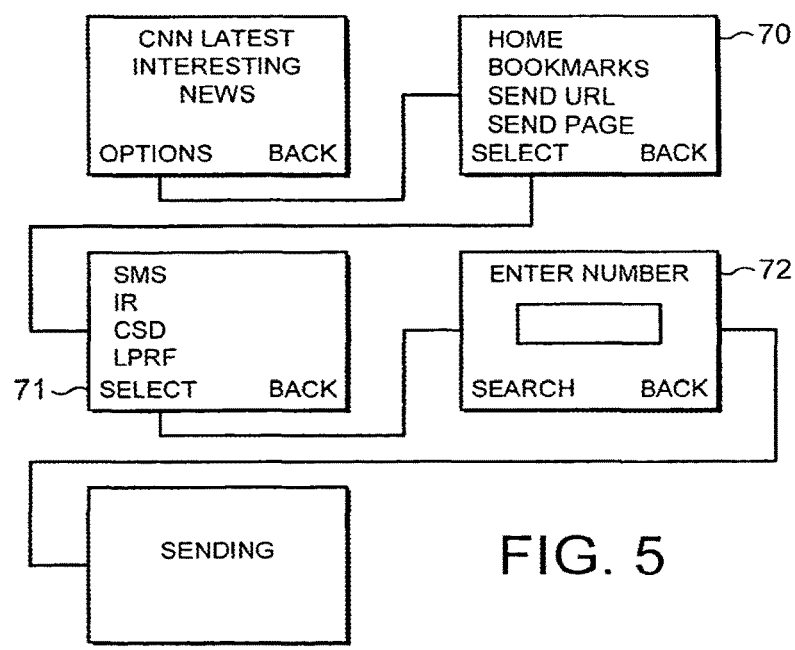
FIG. 5 illustrates a user interface showing steps in the transmission of information in accordance with the present invention.

Referring to FIG. 5, where the sender is viewing content in the form of a WML deck 65, he can, by depressing a suitably programmed softkey 8 obtain access to a menu 70 which permits him to select the content he wishes to send, either a URL of the presently viewed Deck 65 or the Deck 65 itself. The sender is then provided with a further menu 71 from which he must choose the bearer he wishes to use to transport the content, e.g. SMS, Infra Red (IR), Circuit Switched Data (CSD) or Low Power RF (LPRF) or General Packet Radio Service (GPRS). An Editor 72 gives the sender access to a list of names and associated addresses, be they telephone numbers or URLs, to whom the sender may wish to send the content. Alternatively, the sender may simply enter the required address directly into his terminal 1*a*. Once provided with an address, the sender's terminal 1*a* is ready to attempt to deliver the content to the recipient's terminal 1*b*.

However, in the particular case of transmission via Infra Red the receiving terminal does not need to be identified. By simply establishing a line of sight connection between the terminals, the content may be sent direct to the receiving terminal.

In the case where the content is a Deck 65, the sender's terminal 1*a* firstly attempts to establish a connection-oriented session with the recipient's terminal 1*b* by firstly sending a connectionless push to a registered WDP port on the terminal 1*b* which is processed by a Session Initiation Application (SIA) resident on the receiving terminal 1*b*. Clearly, if the receiving terminal 1*c* is not WAP enabled, it might receive this message but does not react to it. As a result, the transmitting terminal does not receive a receive acknowledgement message. Consequently, the transmitting terminal can assume after a certain time that the push was not successful. This might be indicated to the sending terminal by a time-out timer. The sender will then be provided with the option via the UI of sending the content as a text message via SMS as is set out in more detail below. However, assuming the receiving terminal 1*b* is WAP enabled, it is now alerted to the need to receive a WAPpush and providing the recipient has configured the terminal 1*b* to allow the establishment of sessions by this mechanism, a session commences. Otherwise, a message is dispatched to the sender's terminal indicating that delivery of the pushed content is not possible.

Once the session has been established, the sender's terminal 1*a* is able to issue a WAP push command which causes the content to be transported to the recipient's terminal 1*b*. The next step will depend on the capabilities of the recipient's terminal 1*b*. If the terminal 1*b* is capable of supporting multiple browsers or user agents, then the Deck 65 will be routed to a new user agent which runs in the background and which may subsequently be selected by the recipient via the UI of his terminal 1*b* to move the currently in use user agent to the background and to replace it in the foreground with the received Deck 65. Alternatively, where the terminal 1*b* can support a single browser or user agent only, the recipient will be prompted via the UI to exit the existing Deck in favour of the received Deck 65. In such circumstances where the recipient elects not to exit the existing user agent, a message will be delivered to the sender's terminal 1*a* indicating the rejection of the content 65. Optionally, the user might have the possibility to save the pushed message into a memory of his terminal for later use.

In the event that the receiving terminal 1*c* is not WAP enabled, the sender may send the content via the standard SMS route. This method may be selected by the sender initially where he knows that the recipient does not have a WAP enabled terminal 1*c*, or more likely following an unsuccessful attempt to initiate a WAP session as set out in the preceding paragraph. In either case, an application in the sending terminal 1*a* extracts the textual content from each card of the deck 65 and pastes it into one or more SMS text messages for transport according to the bearer selected by the sender. Thus, the content may be transported as an SMS over the network via the SMSC or directly between the terminals 1a,1c using IR or LPRF. The SMS text message(s), once received by the receiving terminal, may be viewed in a conventional manner.

Figures 6, 7:
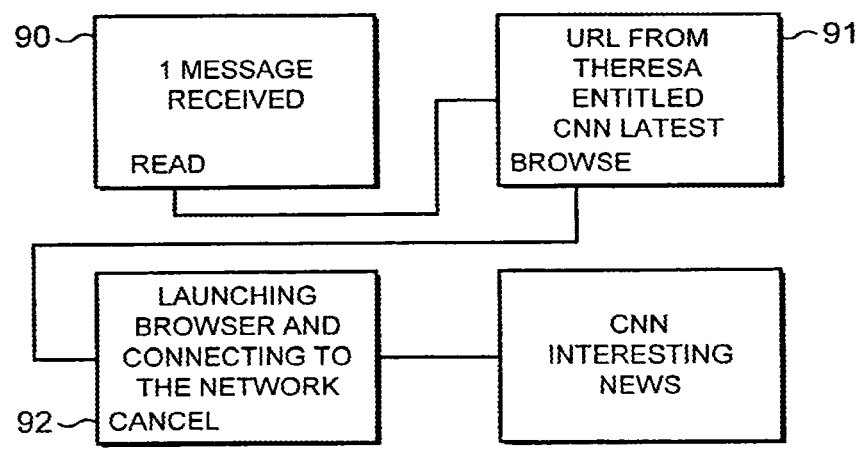
FIG. 6 illustrates the message structure of a text message in accordance with the invention.
FIG. 7 illustrate a user interface showing steps in the reception of information in accordance with the present invention.

Turning now to the situation where the content is a URL, FIG. 6 shows the format of a URLCard 80 as an SMS text message. The data for inclusion in the URLCard 80 is extracted from the corresponding Deck 65 and stored as a title T 81 and web address or URL U 82. The URLCard 80 includes a header 83 which identifies the nature of the URLCard 80 to an application on the receiving terminal 1b In use, the URLCard 80 is generated from the Deck 65 as described in the preceding paragraph using an application in the sender's terminal 1a. The push mechanism described above in relation to the Deck 65 as content is used to transport the URLCard to the receiving terminal 1b. Thus, the Card80 may be transmitted as an SMS text message via a conventional Short Message Service Centre (SMSC) which routes the URLCard 80 to the terminal 1b identified as the recipient. Alternatively, where the sender and receiver are in close proximity the URLCard 80 may instead be transferred directly between the terminals using IR or LPRF as selected by the sender. As illustrated in FIG. 7, following receipt by the recipient terminal 1b, the URLCard 80 it is identified by the application resident in the terminal 1b as being in the form of an SMS text message 90. The application then recognises the header 83 and determines that the URLCard contains a URL. Subsequently, the Title 81 and URL 82 are extracted by the terminal and when selected by the recipient this data is displayed 91 together with a legend next to the suitably programmed softkey 8 the depression of which softkey 8 causes the browser to be launched 92 and connection to the URL attempted.

In the event that the receiving terminal 1c is not WAP enabled, the sender may elect to send the content via the standard SMS text message route. This method may be selected by the sender initially where he knows that the recipient does not have a WAP enabled terminal or more likely following an unsuccessful attempt to initiate a WAP session as has been described above in relation to the Deck 65 as content. In either case, an application in the sending terminal 1a extracts the URL and title from the relevant Deck 65 and pastes it into one or more SMS text messages for transport according to the bearer selected by the sender. Thus, the content may be transported as an SMS text message over the network or directly between the terminals using IR or LPRF. The SMS, once received by the receiving terminal 1c, is viewed in a conventional manner. Clearly, where the receiving terminal 1c is not WAP enabled, it will not be possible to launch a browser to access the URL from the receiving terminal. In which case, although the URL-Card 80 may be displayed as an SMS, no option will be given via the softkey to launch a (non-existent) browser.

In the case where the contents are the browser settings for a gateway necessary to access a specific service they are stored in an SMS text message format with an appropriate identifier in the header and through the WAPpush mechanism set out previously in relation to the Deck and URL content, the content is transmitted to the receiving terminal 1b. Different services may be accessed through one gateway via the same settings in the terminal. In the event that the receiving terminal 1c is not WAP enabled, the content will be rejected in the manner described (time out a sending terminal) above in relation to the other forms of content. Although the option of sending the content via the SMS route could be carried out there does not seem to be any practical benefit in sending such content to a non enabled terminal 1c. However, assuming the receiving terminal 1b is WAP enabled, an application resident on the receiving terminal 1b identifies that the content is a browser setting from the header of the SMS text message. The application then prompts the recipient, via the UI, to either discard the browser settings or to store them in the terminal for later use.

Figure 8A:
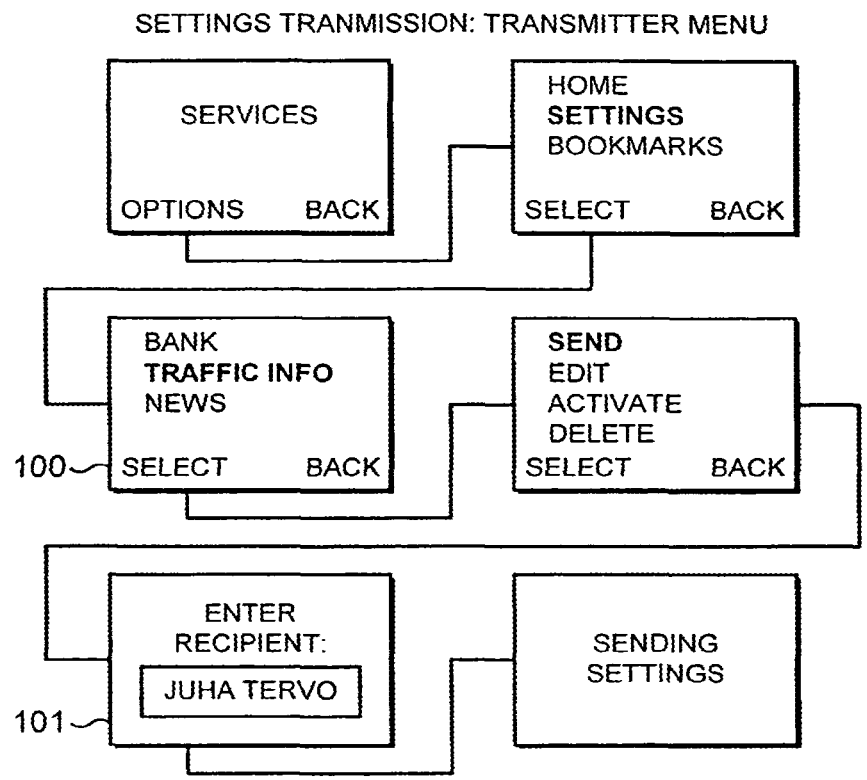
FIGS. 8a and 8b illustrate a variant of the user interface showing steps in the transmission and reception of setting information in accordance with the invention.
Figure 8B:
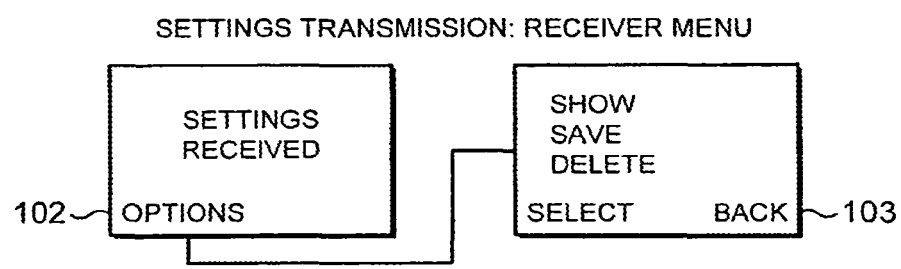

It will be understood that where reference is made in the foregoing to an application for processing the content for either transmission or reception, this lies within the abilities of those skilled in the art. It will further be appreciated that in the interest of minimising the complexity of a user interface, the decision on which bearer to use for the connection may be under software control. FIG. 8 is illustrative of a variant of the transmission process described above in relation to FIG. 5 in which the user simply selects the recipient of the resource information 100 from his phone book 101, for example and under software control the sending terminal, as part of the negotiation process, identifies the most suitable bearer depending on the capability of each terminal. The user may be provided with the ability to select a preferred mode for the connection, i.e. the least expensive in which case the sending terminal might choose to send a URL to the receiving terminal rather than an entire web page which would require much greater resources. Furthermore, where the user wished to use a line of sight bearer such as IR then this would override the software selection process set out above. FIG. 8b illustrates the steps involved in the reception 102 and decision making 103 by the user of the received settings information.

What is claimed:

1. A method comprising:
   establishing, by a first mobile terminal, a first connection from the first mobile terminal via a wireless communication network to a server, to access a resource; and
   initiating, by the first mobile terminal, a transfer of resource related information relating to the resource to a second mobile terminal over a direct wireless communication between the first mobile terminal and the second mobile terminal without passing via an intermediate terminal or server, wherein the resource related information facilitates access to the resource.

2. A method of claim 1, further comprising:
   initiating, by the first mobile terminal, the direct wireless communication with the second mobile terminal.

3. A method of claim 2, further comprising:
   initiating, by the first mobile terminal, a presentation on a user interface of the first mobile terminal a prompt for selecting one or more bearers for the direct wireless communication.

4. A method of claim 2, further comprising:
   determining, by the first mobile terminal, the second mobile terminal based, at least in part, on a phone book stored in the first mobile terminal.

5. A method of claim 1, wherein the transfer from the first mobile terminal to the second mobile terminal is in a real-time manner.

6. A method of claim 1, wherein the resource related information comprises a uniform resource locator of the resource and one or more settings for the second mobile terminal to access the resource other than a file type, and the resource related information excludes the resource.

7. A method of claim 6, wherein the one or more settings include a title identifying a nature of the resource related information to a user of the second mobile terminal, a header identifying the nature of the resource related information to an application on the second mobile terminal, and wherein the direct wireless communication comprises an infra red link, a low power radio frequency link, or a combination thereof.

8. A method comprising:

receiving a transfer of resource related information over a direct wireless communication from a first mobile terminal at a second mobile terminal without passing via an intermediate terminal or server, wherein the resource related information facilitates access to the resource; and initiating, by the second mobile terminal, based on the resource related information a connection to access the resource over a wireless communication network without passing via the first mobile terminal.

9. A method of claim 8, further comprising:

receiving, by the second mobile terminal, a request from the first mobile terminal for approval to establish the direct radio communication; and initiating, by the second mobile terminal, a transfer of an acknowledgement message of the request to the first mobile terminal.

10. A method of claim 9, further comprising:

determining, by the second mobile terminal, information in the acknowledgement message based, at least in part, on a communication capability of the second mobile terminal.

11. A method of claim 8, further comprising:

initiating, by the second mobile terminal, a presentation on a user interface of the second mobile terminal a prompt for discarding or storing the resource related information.

12. A method of claim 8, wherein the resource related information comprises a uniform resource locator of the resource and one or more settings for the second mobile terminal to access the resource other than a file type, and the resource related information excludes the resource.

13. A method of claim 12, wherein the one or more settings include a title identifying a nature of the resource related information to a user of the second mobile terminal, a header identifying the nature of the resource related information to an application on the second mobile terminal, and wherein the direct wireless communication comprises an infra red link, a low power radio frequency link, or a combination thereof.

14. A method of claim 13, wherein the one or more settings include the title, and wherein the title and the uniform resource locator are displayed on a user interface at the second mobile terminal upon user selection.

15. A method of claim 8, further comprising:

when determining that the second mobile terminal does not support a protocol handling the resource related information, wherein the protocol is specified in the request, indicating, by the second mobile terminal, in the acknowledgement message that handling of the resource related information is not possible using the protocol.

16. A method comprising:

establishing, by a first mobile terminal, a first connection from the first mobile terminal via a wireless communication network to a server, to access a resource;

initiating, by the first mobile terminal, a transfer of resource related information relating to the resource to a second mobile terminal over a direct communication between the first mobile terminal and the second mobile terminal without passing via an intermediate terminal or server, wherein the resource related information facilitates access to the resource; and initiating, by the second mobile terminal based on the resource related information, a second connection to access the resource without passing via the first mobile terminal.

17. A method of claim 16, further comprising:

initiating, by the first mobile terminal, a transfer of a request for approval to establish the direct wireless communication; and initiating, by the second mobile terminal, a transfer of an acknowledgement message of the request to the first mobile terminal.

18. A method of claim 16, wherein the direct wireless communication comprises an infra red link, a low power radio frequency link, or a combination thereof.

19. A method of claim 16, further comprising:

determining, by the first mobile terminal, the second mobile terminal based, at least in part, on a phone book stored in the first mobile terminal.

20. A method of claim 16, wherein the resource related information comprises a uniform resource locator of the resource and one or more settings for the second mobile terminal to access the resource other than a file type, and the resource related information excludes the resource.

* * * * *